United States Patent
Nakagawa

Patent Number: 5,733,395
Date of Patent: Mar. 31, 1998

[54] PNEUMATIC TIRE FOR TWO-WHEELED VEHICLE WITH HARD RUBBER LAYER OUTSIDE CARCASS TURN-UP

[75] Inventor: Hidemitsu Nakagawa, Tokyo, Japan

[73] Assignee: Bridgestone Corporation, Tokyo, Japan

[21] Appl. No.: 681,377

[22] Filed: Jul. 23, 1996

[30] Foreign Application Priority Data

Jul. 25, 1995 [JP] Japan ................. 7-189149

[51] Int. Cl.$^6$ .............. B60C 9/00; B60C 13/00; B60C 15/00; B60C 15/06
[52] U.S. Cl. .......... 152/525; 152/539; 152/541; 152/543; 152/546; 152/547; 152/555
[58] Field of Search ............... 152/525, 555, 152/539, 541, 543, 546, 547, 532

[56] References Cited

U.S. PATENT DOCUMENTS

| | | | |
|---|---|---|---|
| 3,052,275 | 9/1962 | Hylbert, Jr. | 152/555 X |
| 3,232,331 | 2/1966 | Cappa et al. | 152/546 X |
| 4,139,040 | 2/1979 | Samoto et al. | |
| 4,227,563 | 10/1980 | Grosch et al. | 152/543 X |
| 4,285,381 | 8/1981 | Furukawa et al. | 152/546 X |
| 4,326,576 | 4/1982 | Mizumoto et al. | |
| 4,872,497 | 10/1989 | Hanada et al. | 152/546 X |
| 4,930,560 | 6/1990 | Lesti et al. | |
| 5,526,863 | 6/1996 | Hodges | 152/555 X |

FOREIGN PATENT DOCUMENTS

| | | | |
|---|---|---|---|
| 0 247 422 | 12/1987 | European Pat. Off. | |
| 0 631 889 | 1/1995 | European Pat. Off. | |
| 55-148603 | 11/1980 | Japan | 152/541 |
| 56-21602 | 5/1981 | Japan | 152/543 |
| 62-4614 | 1/1987 | Japan | 152/543 |
| 62-152909 | 7/1987 | Japan | 152/543 |
| 1-237205 | 9/1989 | Japan | 152/539 |
| 4-55108 | 2/1992 | Japan | 152/539 |
| 6-199116 | 7/1994 | Japan | |
| 2005201 | 4/1979 | United Kingdom | |

*Primary Examiner*—Adrienne C. Johnstone
*Attorney, Agent, or Firm*—Sughrue, Mion, Zinn, Macpeak & Seas, PLLC

[57] ABSTRACT

A pneumatic tire for a two-wheeled vehicle has a hard rubber layer having a Shore A hardness of 60° to 90° arranged along the outside of the turn-up portion of a carcass, wherein a ratio (a/H) is within the range of 0.1 to 0.7 in which (a) is the height of the outer end in the tire radial direction of the hard rubber layer measured from the height of a flange of a rim on which the tire is assembled, and (H) is the height of the tread edge of the tread portion measured from the same, and wherein the inner end in the tire radial direction of the hard rubber layer is located inward of the flange height of the rim.

6 Claims, 4 Drawing Sheets

PNEUMATIC TIRE FOR TWO-WHEELED VEHICLE WITH HARD RUBBER LAYER OUTSIDE CARCASS TURN-UP

BACKGROUND OF THE INVENTION

1. Field of the Invention

The present invention relates to a pneumatic tire for a two-wheeled vehicle, and more particularly to a pneumatic tire for a two-wheeled vehicle having improved steering stability during cornering of the two-wheeled vehicle, usually a motorcycle, as well as sufficient durability, and excellent safety. The invention is particularly concerned with a high performance motorcycle tire, by which is generally meant a radial tire for a motorcycle capable of a maximum speed of at least 240 km/h.

2. Description of the Prior Art

A reinforcing layer, such as a hard rubber layer, is often arranged at the sidewall portion as an advantageous technique for improving steering stability in order to generate large lateral force (side force or cornering force in this case) in a pneumatic tire for a four-wheeled vehicle, such as a passenger car.

Application of the above technique to a pneumatic tire for a two-wheeled vehicle inevitably causes the following disadvantage because of increasing the rigidity of the sidewall portion excessively.

That is, in general, the so-called crown radius of the tread of the tread portion of a tire for a two-wheeled vehicle is very small in comparison with that of a tire for a four-wheeled vehicle, whereby the tire for a two-wheeled vehicle has high cornering performance. The cornering performance of a two-wheeled vehicle depends on the quantity of camber thrust, which is different from the case of a tire for a four-wheeled vehicle. The above camber thrust is obtained by giving the tire a camber angle, and wide ground-contact area under large camber angle is obtained by a small crown radius.

Wide ground-contact area under large camber angle generates large shearing force from the road surface to the tread, which is an indispensable condition for generating a desirable large camber thrust. However, sufficient improvement of the rigidity of the sidewall portion largely decreases the ground-contact area of the tread of the tire under large camber angle, and decreases the shearing force generated between the road surface and the tread. As a result, the effect obtained by improving the rigidity of the sidewall portion is effectively cancelled, that is, large camber thrust cannot be obtained and steering stability during cornering is deteriorated.

Moreover, there is a tendency to generate cracks at the outer end in the tire radial direction of the reinforcing hard rubber layer at the sidewall portion, which causes deterioration in durability of the tire. That is, providing a hard rubber layer as a sidewall reinforcing layer is not a practical means for improving a pneumatic tire for a two-wheeled vehicle, as mentioned above.

SUMMARY OF THE INVENTION

Therefore, it is the object of the present invention to provide a pneumatic tire for a two-wheeled vehicle having improved steering stability by the consistency of the rigidity of the sidewall portion and good ground-contact of the tread, in order to improve cornering performance and maintain the safety of the two-wheeled vehicle without deterioration of durability, especially resisting rim chafing, of the pneumatic tire.

The present invention provides a pneumatic tire for a two-wheeled vehicle, mounted on a standard rim and inflated to a standard inner pressure comprising a carcass extending between bead cores embedded in a pair of bead portions and reinforcing a pair of sidewall portions and a tread portion. The carcass comprises a main body portion which reinforces the sidewall, tread portions and turn-up portions which turn up around the bead cores. The tire further comprises:

a hard rubber layer, the Shore A hardness of which is within a range of 60° to 90° at room temperature, is arranged along the outside of the turn-up portion;

a ratio (a/H) is in the range of 0.1 to 0.7, in which the height (a) of the outer end in the tire radial direction of said hard rubber layer is measured from the position of flange height of the rim and the height (H) of the tread edge of the tread portion is measured from the position of said flange height;

and the inner end in the tire radial direction of the hard rubber layer is positioned at an inner side in the tire radial direction relative to the position of flange height of the rim.

It is preferable that (i) the hard rubber layer is a rubber strip at least 0.5 mm in thickness;

(ii) a soft rubber layer is arranged along the outside of the hard rubber, having a hardness less than that of the hard rubber and being at least 1 mm in thickness; and (iii) the main body portion and the turn-up portion of the carcass contact each other in the vicinity between the outer surface of the bead core and the end of the turn-up portion.

The tire of the invention preferably has a tread width which is wider than the maximum distance between the tire sidewalls.

The tire of the invention is preferably a high performance motorcycle tire, that is a radial tire for a motorcycle capable of a maximum speed of at least 240 km/h.

DESCRIPTION OF THE PREFERRED EMBODIMENTS

The present invention is explained in more detail in the following, with reference to FIG. 1, which shows the left-half section on a plane passing the rotational axis of an assembly of an embodiment tire and a rim fitting the tire.

Figure 1:
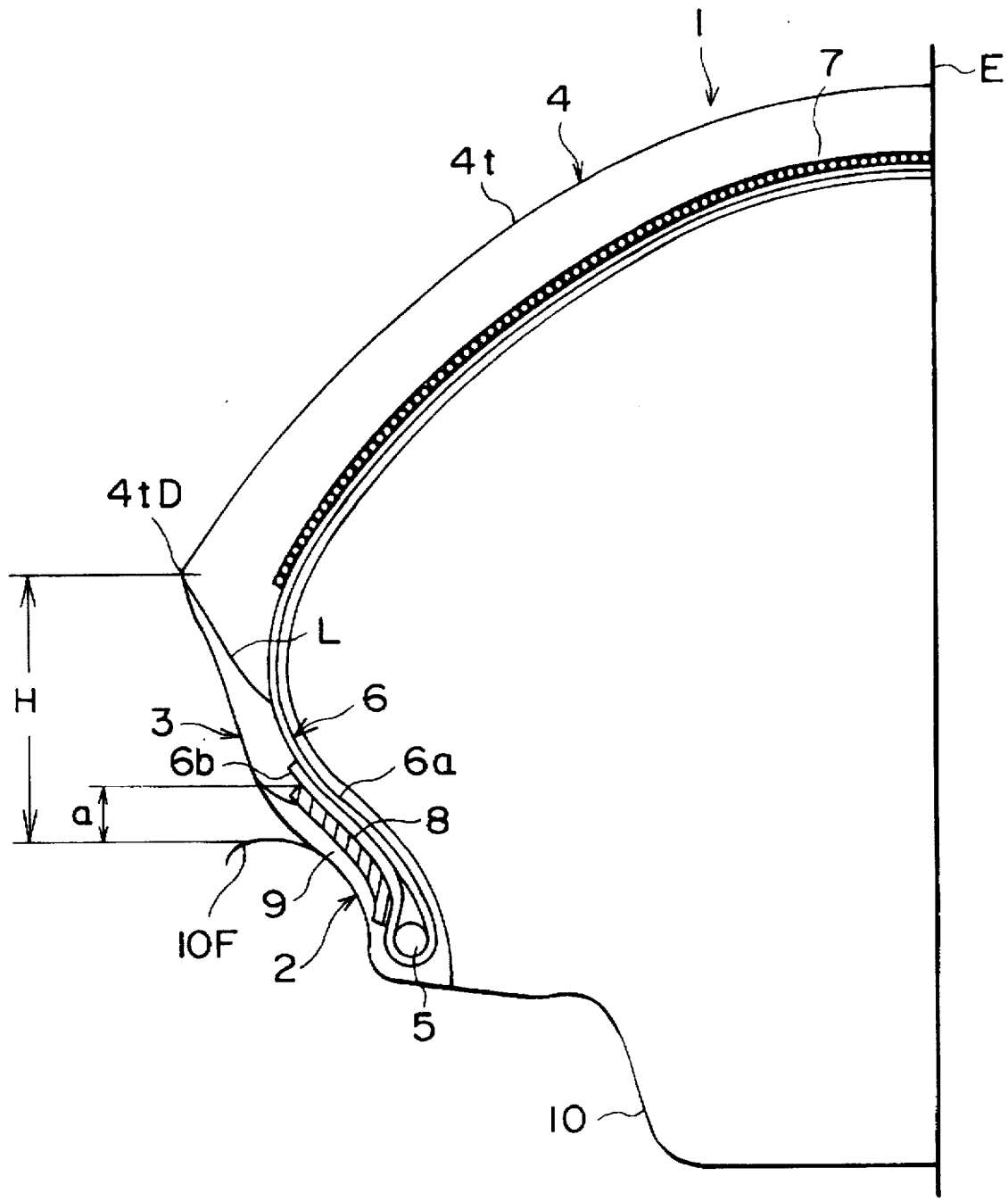
FIG. 1 is a left-half section view of a pneumatic tire for a two-wheeled vehicle according to the present invention, assembled on a rim.

FIG. 1 shows a tire-rim assembly 1, a pair of bead portions 2 (only one is shown), a pair of sidewall portions 3

(only one is shown) and a tread portion 4. A carcass 6 extends between bead cores 5 embedded in the bead portions 2 and reinforces the sidewall portions 3 and the tread portion 4. Line L is a boundary between the sidewall rubber of the sidewall portion 3 and the tread rubber of the tread portion 4. Grooves provided in the tread 4t of the tread portion 4 are omitted in the figure.

The carcass 6 comprises a main body portion 6a reinforcing the sidewall portions 3 and the tread portion 4 and turn-up portions 6b turning up around the bead cores 5. In the present invention, the carcass 6 can be at least one rubberised ply of textile cord arranged radially or at least two rubberised plies of textile cord arranged in bias fashion with the cords in the adjacent plies crossed with each other. On the crown of the carcass 6, a belt 7 is disposed in the case of a radial ply in order to reinforce the tread portion 4, and in the case of the bias ply a breaker 7 may be optionally provided. In the case of the belt 7, it is preferable that the belt is at least one ply of textile cord, more preferably a ply formed by polyamide cord(s) (KEVLAR) being spirally wound. FIG. 1 shows a belt 7 of one ply, as mentioned above.

A hard rubber layer 8 is arranged along the outside of the turn-up portion 6b of the carcass 6. The hard rubber layer 8 has high hardness, that is a Shore A hardness of 60° to 90° at room temperature, that is 20° C. to 25° C.

At the tire-rim assembly 1, as shown in FIG 1, the ratio a/H is within a range of 0.1 to 0.7, preferably 0.1 to 0.6, in which the height a of the outer end in the tire radial direction of the hard rubber layer 8 is measured from the position of the height of a flange 10F of a rim 10, of which the outside outline is shown in the figure. The height H of the edge 4tD of the tread 4t of the tread portion 4 is measured from the position of the height of the flange 10F. The rim used in the invention is in accordance with the standard of JATMA YEAR BOOK, and the assembly 1 is a rim and a tire assembled adequately to the above rim in standing posture.

Also, the inner end in the tire radial direction of the hard rubber layer 8 is positioned at the inner side relative to the flange height of the rim 10, that is the inner end is settled in the flange 10F. The inner end can extend to a position facing the outside of the bead core 5.

The function and effect obtained by the above mentioned construction is explained in the following.

Figure 2:
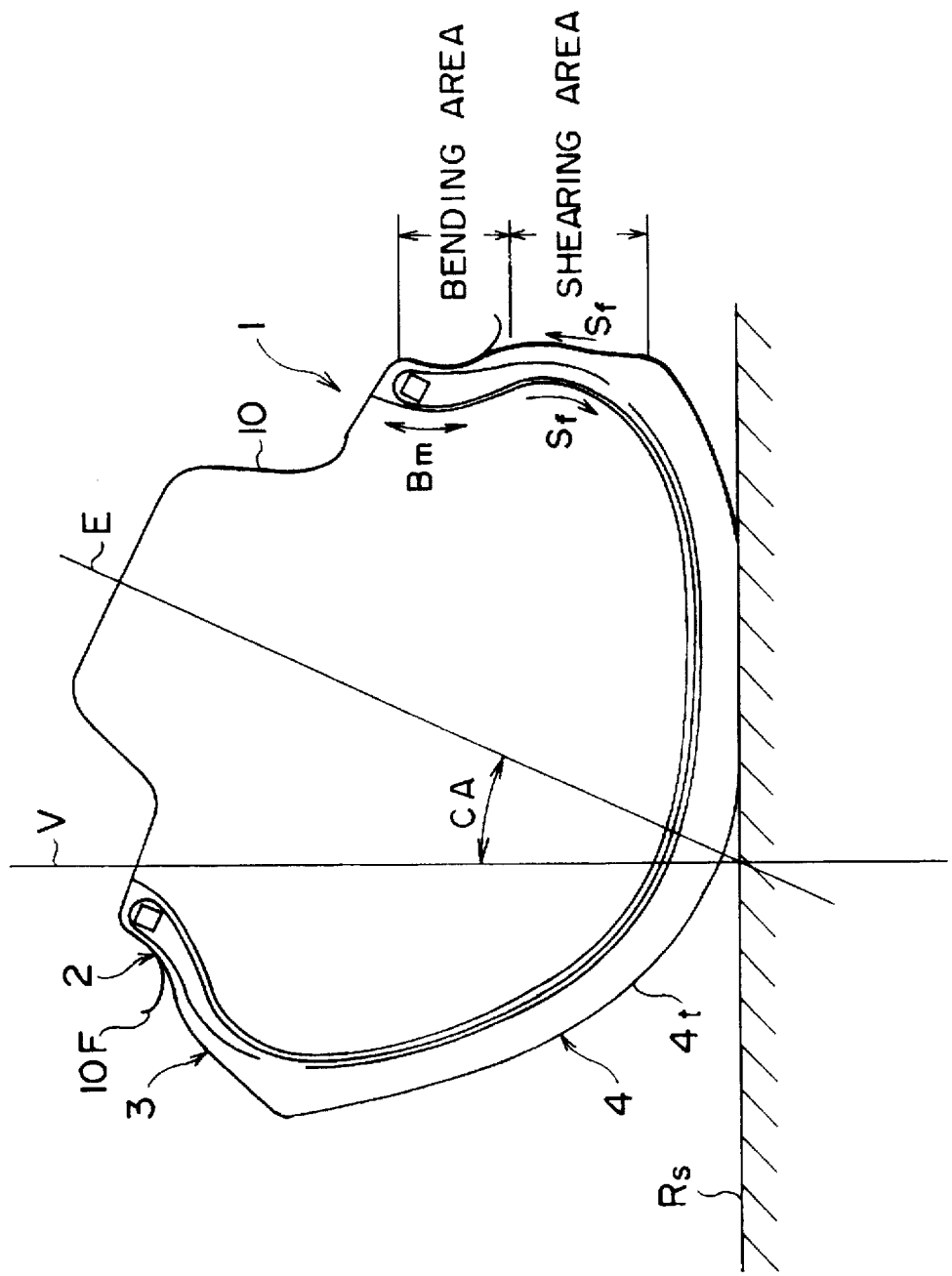
FIG. 2 is a section view of a tire for a two-wheeled vehicle assembled on a rim, for explanation of the stresses occurring during cornering.

FIG. 2 is a section view of an assembly 1 when a two-wheeled vehicle turns, wherein a camber angle CA to the road surface Rs is given to the tire-rim assembly 1.

In FIG. 2, the right side of the tire from a normal V to the road surface Rs of the tire is mainly transformed. The transformation between the bead portion 2 and the tread edge 4tD of the tread portion 4 was analysed to find, as shown in the figure, that the portion extending to a little beyond the height of the flange 10F of the rim at the bead portion 2 side is mainly bending (transformation) area, and the portion between the above area and the vicinity of the tread edge 4tD, near which is located the end of the turn-up portion 6b of the carcass 6, is shearing (transformation) area because of force Sf acting mainly on the main body portion 6a and the turn-up portion 6b of the carcass 6.

Figure 3:
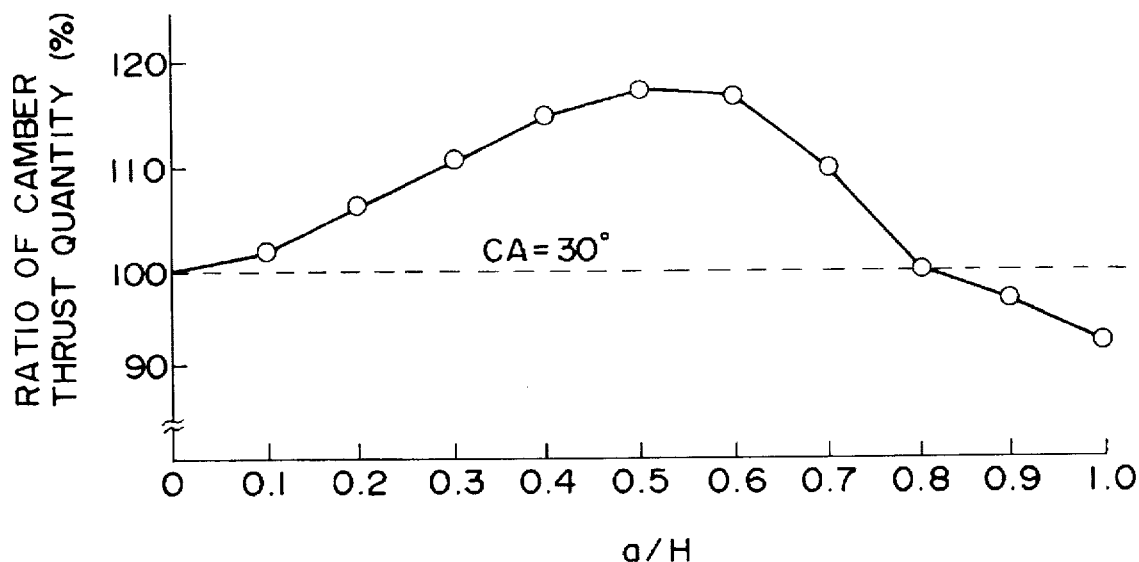
FIG. 3 is a graph explaining the relation between the camber thrust quantity and the height of the hard rubber layer of a tire for a two-wheeled vehicle.

Bending moment Bm acts on the portion of the tire at the bending area, and therefore the inner side of the tire is extended (as shown by both ends of the arrow) and the outer side of the tire is compressed (the arrow is omitted). The hard rubber layer 8 is arranged at the bending area, whereby the rubber layer 8 is acted on by compression force. Rubber has a characteristic that compression rigidity is much higher than extension rigidity, and therefore the rigidity at least in the bending area is largely improved. Thus the above mentioned ratio a/H needs to be at least 0.1 as shown in FIG. 3. A further effect is obtained when the said ratio is at least 0.2. FIG. 3 is a graph of a pneumatic tire for a two-wheeled vehicle of size 120/70ZR 17, where the vertical axis is a ratio (%) of camber thrust quantity on the basis that the camber thrust quantity of a conventional tire comprising a bead filler rubber is 100, which is the same as FIGS. 4 and 5, and the horizontal axis is the ratio a/H.

The shearing force at the shearing area increases gradually toward the end of the turn-up portion 6b. The hard rubber layer 8 decreases in contribution to improvement of the rigidity of the area where the component of the shearing force is major (cf. FIG. 3), and separation is likely to generate when the end of the hard rubber layer 8 is arranged at the area where large shearing force acts. Also, especially in order to obtain the ground-contact area of the tread 4t sufficiently, the value a/H is not more than 0.7, preferably not more than 0.6, having consideration of the effect as shown in the graph of FIG. 3.

Figure 4:
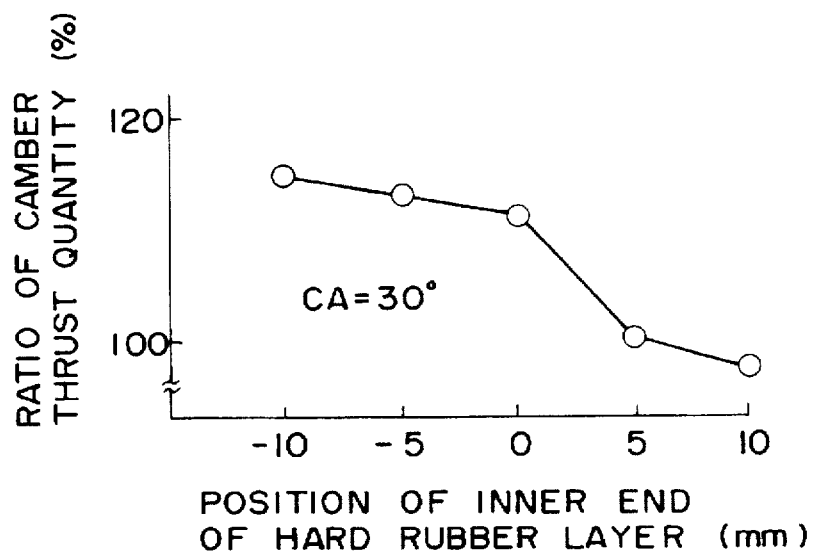
FIG. 4 is a graph explaining the relation between the camber thrust quantity and the position of the inner end of the hard rubber layer of a tire for a two-wheeled vehicle.

Also, as is apparent from FIG. 4 where the position of the inner end in the tire radial direction of the hard rubber layer 8 is measured on the basis that the height of the flange 10F of the rim 10 is 0 (zero), when the inner end is positioned higher than the height of the flange 10F of the rim 10, the camber thrust quantity rapidly decreases, and furthermore it is less than that of a conventional tire. Therefore, the inner end is positioned lower than the height of the flange 10F. In FIG. 4, a minus sign before a numerical value on the horizontal axis means a position which is lower than the height of the flange 10F.

Figure 5:
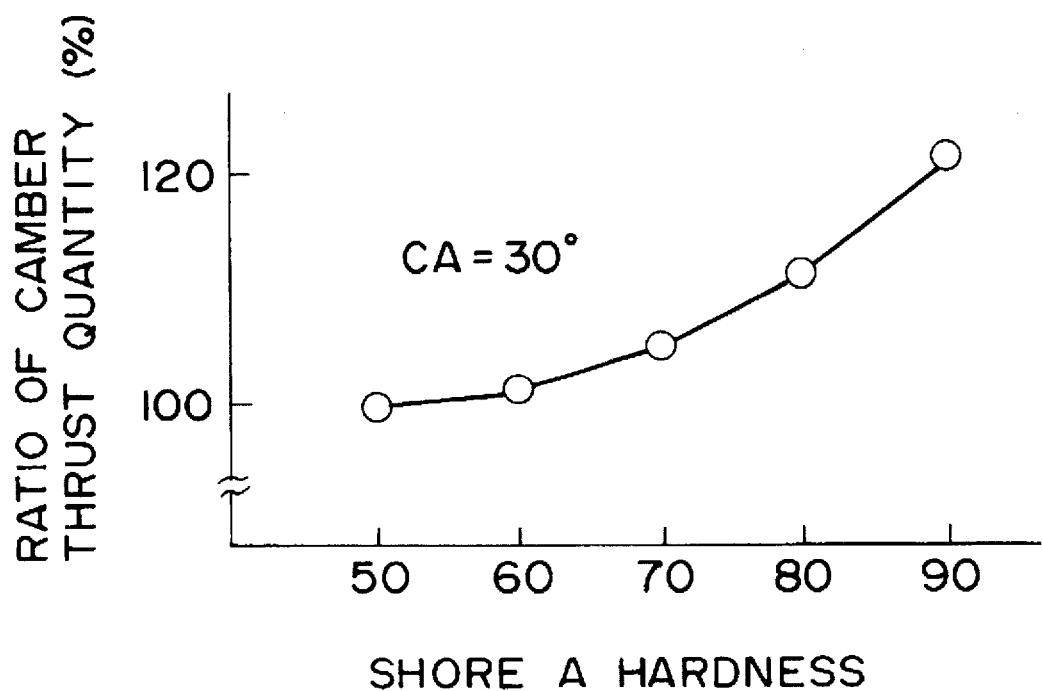
FIG. 5 is a graph explaining the relation between the camber thrust quantity and the hardness of the hard rubber layer of a tire for a two-wheeled vehicle.

Also, as is apparent from FIG. 5, where the horizontal axis is the Shore A hardness of the hard rubber layer (8) at room temperature, the hardness of the rubber layer (8) must be not less than 60°. When the hardness is more than 90°, cracks are likely to generate from the outer end in the tire radial direction of the hard rubber layer (8), which causes separation damage, and therefore the hardness must be not more than 90°.

In addition it is preferable that the hard rubber layer 8 is a rubber strip at least 0.5 mm in thickness, because it is possible to obtain a desirable improvement of rigidity and to manufacture such a strip easily. It is also preferable that a soft rubber layer 9 having a lower hardness than that of the hard rubber and being at least 1 mm in thickness is arranged outside of the hard rubber 8, in order to obtain resisting rim chafing sufficiently.

Also, it is preferable that the turn-up portion 6b of the carcass 6 contacts the main body portion 6a between the vicinity of the outer surface of the bead core 5 and the end of the turn-up portion 6b, in order to reduce the tire weight to be less than that of a conventional tire comprising bead filler rubber, to obtain higher rigidity of the tire than that of the conventional tire and also excellent steering stability.

This invention will be further described with reference to the following particular embodiments.

The size of the radial ply tire for a two-wheeled vehicle (motorcycle) was 120/70ZR17. The carcass 6 consisted of two plies of radial-arranged nylon cords (1260D/2). Bead filler rubber was not arranged from the bead core 5 along the main body portion 6a toward the tread portion 4. Therefore, the main portion 6a and the turn-up portion 6b contacted each other at the vicinity of the outer surface of the bead core 5. The belt 7 was comprised of one ply of spirally-wound KEVLAR (polyamide) cord (1500D/2).

The rim assembled with above size of tire was 3.50 inches in nominal rim width and 14.0 mm in flange height according to JATMA YEAR BOOK. With the rim and the above construction of the tire in common, assemblies of rims and embodiment tires 1 to 8, comparative tires 1 and 2, and a conventional tire which did not comprise a reinforcing rubber layer, were prepared, respectively. Table 1 below indicates the construction of the reinforcing rubber layer 8 and the soft rubber layer 9 arranged in the embodiment tires and the comparative tires. In the Table, the reinforcing rubber layer 8 is abbreviated to Hard rubber, the soft rubber layer 9 to Soft rubber, and the Shore A hardness of the rubber layer to Hd.

TABLE 1

|  | Embodiment Tires | | | | | | | | Comparative Tires | |
| --- | --- | --- | --- | --- | --- | --- | --- | --- | --- | --- |
|  | 1 | 2 | 3 | 4 | 5 | 6 | 7 | 8 | 1 | 2 |
| Hard rubber Hd | 80° | 75° | 85° | 70° | 70° | 70° | 70° | 70° | 95° | 70° |
| Hard rubber Thickness (mm) | 1.5 | 2.0 | 1.0 | 1.0 | 1.0 | 1.0 | 1.0 | 1.0 | 1.0 | 1.0 |
| a/H | 0.6 | 0.6 | 0.6 | 0.6 | 0.6 | 0.6 | 0.1 | 0.7 | 0.6 | 0.8 |
| Soft rubber Hd | 51° | 51° | 51° | 51° | 45° | 55° | 51° | 51° | 51° | 51° |
| Soft rubber Thickness (mm) | 1.0 | 1.0 | 1.0 | 1.0 | 1.0 | 1.0 | 1.0 | 1.0 | 1.0 | 1.0 |
| Steering Stability | 120 | 115 | 125 | 115 | 112 | 117 | 103 | 110 | 110 | 95 |
| Durability | 103 | 105 | 103 | 100 | 102 | 100 | 100 | 103 | 90 | 100 |

The above embodiment tires, the comparative tires and conventional tire were tested and evaluated as test tires under the following test conditions:

(1) Steering stability: The above test tires were assembled on a rim in size of nominal rim width MT3.50 (MT refers to Motorcycle Tubeless Tire), and were inflated to inner pressure 2.5 kgf/cm². After that, the camber thrust was measured by a steering test machine under conditions of test load 150 kg, camber angle 30° and running speed 30 km/h.

(2) Durability: The above test tires were assembled on the above rim, and were inflated to inner pressure 1.3 kgf/cm². After that, they were pressed against a test drum under a load 215 kg and were run at speed 81 km/h, and there was measured the running distance until a break-down occurred between the bead portion and sidewall portion.

The test results are represented by indices on the basis that the conventional tire is 100, and the indices are shown at the bottom columns of Table 1. The larger the indices, the better the results. As is apparent from Table 1, the embodiment tires show good results in terms of durability which were by no means inferior to the conventional tire and excellent results in terms of steering stability. The comparative tires show results in which either the steering stability (in the case of Comparative Tire 2) or the durability (in the case of Comparative Tire 1) were inferior to those of the conventional tire.

According to the present invention, a hard rubber is arranged along the outside of the turn-up portion, whereby it is possible to obtain sufficient tire rigidity and wide ground-contact area which could not be obtained by the conventional means. Therefore steering stability during the cornering of two-wheeled vehicles canbe improved to a desirable level. The present invention provides a pneumatic tire for two-wheeled vehicles having the above steering stability and good durability.

While the invention has been particularly shown and described with reference to certain preferred embodiments thereof, it will be understoodby those skilled in the art that various changes and modifications may be made within the spirit and scope of the invention.

I claim:

1. A two-wheeled vehicle pneumatic tire, comprising a carcass extending between bead cores embedded in a pair of bead portions and reinforcing a pair of sidewall portions and a tread portion, said carcass comprising a main body portion which reinforces said sidewall and tread portions and turn-up portions which turn up around the bead cores;

a hard rubber layer, the Shore A hardness of which is within the range of 60° to 90° at room temperature, arranged along the outside of each turn-up portion;

wherein: said two-wheeled vehicle pneumatic tire is mounted on a standard rim and inflated to a standard inner pressure and a ratio a/H is in the range of 0.1 to 0.7, in which the height a of the outer end in the tire radial direction of said hard rubber layer is measured from the position of height of a flange of the rim, and the height H of the tread edge of the tread portion is measured from the position of said flange height; and the inner end in the tire radial direction of the hard rubber layer is positioned at an inner side in the tire radial direction relative to the position of the flange height of the rim.

2. The two-wheeled vehicle pneumatic tire according to claim 1, wherein the hard rubber layer is a rubber strip at least 0.5 mm in thickness.

3. The two-wheeled vehicle pneumatic tire according to claim 1, further comprising a soft rubber layer arranged along the outside outside of the hard rubber, having hardness less than that of the hard rubber and being at least 1 mm in thickness.

4. The two-wheeled vehicle pneumatic tire according to claim 1, wherein in each bead portion the main body portion and the turn-up portion of the carcass contact each other in the vicinity between the outer surface of the bead core and the end of the turn-up portion.

5. The two-wheeled vehicle pneumatic tire according to claim 1 wherein said ratio a/H is in the range of 0.1 to 0.6.

6. The two-wheeled vehicle pneumatic tire according to claim 1 further comprising a belt radially outside said carcass and including a polyamide cord ply.

* * * * *